United States Patent
Glugla et al.

(10) Patent No.: US 9,181,859 B2
(45) Date of Patent: *Nov. 10, 2015

(54) WASTEGATE CONTROL TO REDUCE CHARGE AIR COOLER CONDENSATE

(71) Applicant: Ford Global Technologies, LLC, Dearborn, MI (US)

(72) Inventors: Chris Paul Glugla, Macomb, MI (US); Shuya Shark Yamada, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

This patent is subject to a terminal disclaimer.

(21) Appl. No.: 13/886,086

(22) Filed: May 2, 2013

(65) Prior Publication Data
US 2014/0328665 A1    Nov. 6, 2014

(51) Int. Cl.
F02D 23/00 (2006.01)
F02B 33/44 (2006.01)
F02B 37/18 (2006.01)
F02D 41/00 (2006.01)
F02B 37/16 (2006.01)

(52) U.S. Cl.
CPC ............ *F02B 37/18* (2013.01); *F02D 41/0007* (2013.01); *F02B 37/16* (2013.01); *F02D 2200/0418* (2013.01); *Y02T 10/144* (2013.01)

(58) Field of Classification Search
CPC .................. F02D 2200/0418; F02D 41/0007; F02B 37/18; F02B 37/16; F28D 2021/0082; F28D 2021/0084
USPC ................. 60/602, 611, 605.1, 599; 123/563; 165/913
See application file for complete search history.

(56) References Cited

U.S. PATENT DOCUMENTS

| | | | |
|---|---|---|---|
| 5,307,783 A | 5/1994 | Satoya et al. | |
| 6,134,888 A | 10/2000 | Zimmer et al. | |
| 6,779,344 B2 | 8/2004 | Hartman et al. | |
| 6,810,067 B2 | 10/2004 | Masood et al. | |
| 7,529,614 B1 | 5/2009 | Müller | |
| 8,001,778 B2 | 8/2011 | Sun | |
| 2010/0077745 A1 | 4/2010 | Robinson | |
| 2010/0180590 A1 | 7/2010 | Andreae et al. | |

(Continued)

FOREIGN PATENT DOCUMENTS

EP    2439392 A1    4/2012

OTHER PUBLICATIONS

Cockerill, Charles A., et al., "Charge Air Cooler Control System and Method," U.S. Appl. No. 13/567,979, filed Aug. 6, 2012, 33 pages.

(Continued)

*Primary Examiner* — Thai Ba Trieu
*Assistant Examiner* — Ngoc T Nguyen
(74) *Attorney, Agent, or Firm* — Julia Voutyras; Alleman Hall McCoy Russell & Tuttle LLP

(57) ABSTRACT

Methods and systems are provided for adjusting a wastegate in response to condensate forming conditions in a charge air cooler (CAC). In one example, a wastegate may be opened in response to an induction pressure greater than a threshold pressure when the induction pressure is greater than required to produce a manifold pressure required for a torque demand. Further, a compressor recirculation valve may be opened to further reduce the induction pressure during certain driving conditions.

20 Claims, 5 Drawing Sheets

(56) References Cited

U.S. PATENT DOCUMENTS

2012/0198837 A1    8/2012  Medina
2014/0047833 A1*   2/2014  Buckland et al. ............... 60/599
2014/0048049 A1*   2/2014  Glugla et al. ................. 123/563

OTHER PUBLICATIONS

Glugla, Chris Paul et al., "Method for Controlling a Variable Charge Air Cooler," U.S. Appl. No. 13/589,942, filed Aug. 20, 2012, 41 pages.

Glugla, Chris Paul et al., "Controlled Transient Acceleration to Evacuate Condensate from a Charge Air Cooler," U.S. Appl. No. 13/708,831, filed Dec. 7, 2012, 27 pages.

Glugla, Chris Paul et al., "Controlling Charge Air Cooler Condensation by Using Heated Intake Air," U.S. Appl. No. 13/771,312, filed Dec. 11, 2012, 24 pages.

Morelli, Anthony, et al., "Compressor Recirculation Valve Control to Reduce Charge Air Cooler Condensate," U.S. Appl. No. 13/886,101, filed May 2, 2013, 40 pages.

* cited by examiner

WASTEGATE CONTROL TO REDUCE CHARGE AIR COOLER CONDENSATE

BACKGROUND/SUMMARY

Engines may utilize a turbocharger or supercharger to compress ambient air entering the engine in order to increase power. Compression of the air may cause an increase in air temperature, thus, an intercooler or charge air cooler (CAC) may be utilized to cool the heated air thereby increasing its density and further increasing the potential power of the engine. Condensate may form in the CAC when the ambient air temperature decreases, or during humid or rainy weather conditions, where the intake air is cooled below the water dew point temperature. Further, when the charge air entering the CAC is boosted (e.g., an induction pressure and boost pressure are greater than atmospheric pressure), condensate may form if the CAC temperature falls below the dew point temperature. As a result, condensate may collect at the bottom of the CAC, or in the internal passages, and cooling turbulators. When torque is increased, such as during acceleration, increased mass air flow may strip the condensate from the CAC, drawing it into the engine and increasing the likelihood of engine misfire and combustion instability.

Engines may utilize a wastegate to divert exhaust gas flow around a turbine of the turbocharger to control an amount of boost provided to an intake manifold of the engine. For example, opening the wastegate may reduce boost pressure and induction pressure. One approach to control the boost and/or induction pressure includes actively controlling the wastegate. One example approach is shown by Hartman et al. in U.S. Pat. No. 6,779,344. Therein, a wastegate is adjusted so actual boost pressure matches a desired boost pressure. The desired boost pressure may be based on a desired manifold pressure (based on air mass flow) and a compressor surge characteristic.

However, the inventors herein have recognized potential issue with such systems. As one example, controlling the wastegate in this way may cause the wastegate to remain closed under conditions when increased boost is not required by a torque demand. As a result, the closed wastegate may build up induction pressure before the throttle, thereby increasing a potential for condensate formation in the CAC.

In one example, the issues described above may be addressed by a method for adjusting a wastegate in an engine to decrease an induction pressure in response to charge air cooler condensate forming conditions. Specifically, a wastegate may be opened in response to charge air cooler condensate forming conditions when an induction pressure between a compressor and a throttle (e.g., pre-throttle pressure) is greater than required to produce a manifold pressure required for a torque demand and the engine is at steady-state conditions. In one example, condensate forming conditions include an induction pressure greater than atmospheric pressure (e.g., an induction pressure ratio greater than 1). In another example, condensate forming conditions include a humidity greater than a first threshold. After opening the wastegate to decrease the induction pressure, the wastegate may be closed in response to one or more of the induction pressure decreasing to the atmospheric pressure and/or an increase in torque demand. Further, during certain engine operating conditions, a compressor recirculation valve may be opened in addition to opening the wastegate to increase the induction pressure reduction.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for adjusting a wastegate and/or a compressor recirculation valve in response to condensate forming conditions in a charge air cooler (CAC). An engine system, such as the engine system shown in FIG. 1, may include a turbocharger with exhaust gas flow through a turbine driving a compressor. The engine may include a wastegate and a compressor recirculation valve (CRV) operable to divert airflow around the turbine and the compressor, respectively. As such, opening the wastegate and/or the CRV, may decrease boost, thereby decreasing an induction pressure, measured upstream of an intake throttle and downstream of a charge air cooler (CAC), and decreasing a potential for condensate formation in the CAC. During select driving conditions, such as when the induction pressure is greater than required to produce an intake manifold pressure (MAP) required for a torque demand, an engine controller may open the wastegate and/or the CRV to reduce the induction pressure and subsequently reduce condensate formation in the CAC. In this way, the controller may open the wastegate and/or CRV to reduce the induction pressure when the MAP required for the torque demand may be produced without boosting. Methods for adjusting the wastegate and/or the CRV to reduce the induction pressure, based on engine operating conditions, are presented at FIGS. 2-4. FIG. 5 illustrates example wastegate and CRV adjustments based on CAC condensate forming conditions and additional engine operating conditions.

Figure 1:
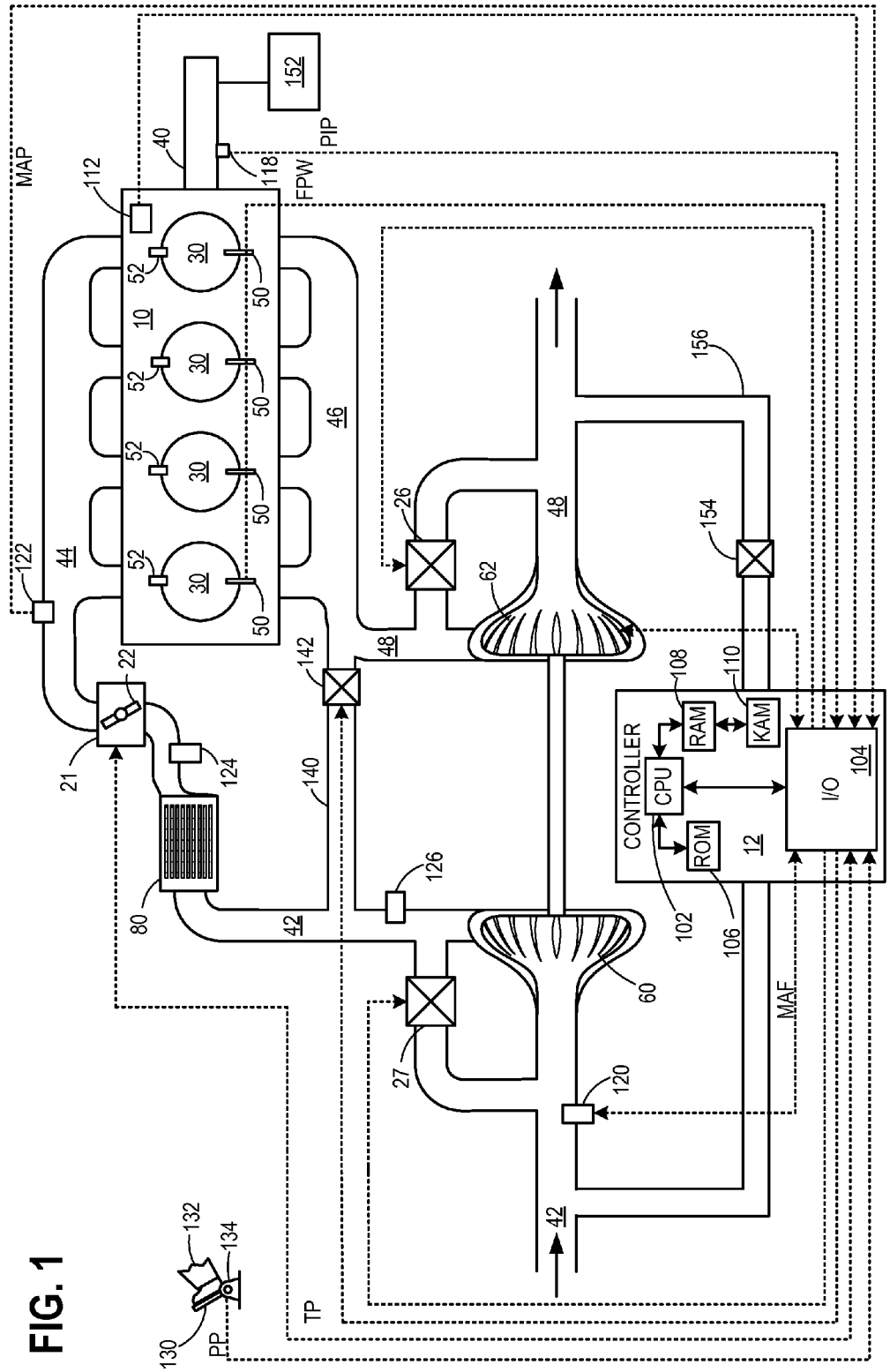
FIG. 1 is a schematic diagram of an example engine system including a charge air cooler.

FIG. 1 is a schematic diagram showing an example engine 10, which may be included in a propulsion system of an automobile. The engine 10 is shown with four cylinders or combustion chambers 30. However, other numbers of cylinders may be used in accordance with the current disclosure. Engine 10 may be controlled at least partially by a control system including a controller 12, and by input from a vehicle operator 132 via an input device 130. In this example, the input device 130 includes an accelerator pedal and a pedal position sensor 134 for generating a proportional pedal position signal PP. Each combustion chamber (e.g., cylinder) 30 of the engine 10 may include combustion chamber walls with a piston (not shown) positioned therein. The pistons may be coupled to a crankshaft 40 so that reciprocating motion of the piston is translated into rotational motion of the crankshaft. The crankshaft 40 may be coupled to at least one drive wheel of a vehicle and use engine output torque to propel the automobile. The crankshaft 40 may also be used to drive an alternator 152.

The combustion chambers 30 may receive intake air from the intake manifold 44 and may exhaust combustion gases via an exhaust manifold 46 to an exhaust passage 48. The intake manifold 44 and the exhaust manifold 46 can selectively communicate with the combustion chamber 30 via respective intake valves and exhaust valves (not shown). In some embodiments, the combustion chamber 30 may include two or more intake valves and/or two or more exhaust valves.

Fuel injectors 50 are shown coupled directly to the combustion chamber 30 for injecting fuel directly therein in proportion to the pulse width of signal FPW received from controller 12. In this manner, the fuel injector 50 provides what is known as direct injection of fuel into the combustion chamber 30; however it will be appreciated that port injection is also possible. Fuel may be delivered to the fuel injector 50 by a fuel system (not shown) including a fuel tank, a fuel pump, and a fuel rail.

In a process referred to as ignition, the injected fuel is ignited by known ignition means such as spark plug 52, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. In one example, spark may be retarded during a tip-in.

The intake manifold 44 may receive intake air from an intake passage 42. The intake passage 42 includes a throttle 21 having a throttle plate 22 to regulate flow to the intake manifold 44. In this particular example, the position (TP) of the throttle plate 22 may be varied by the controller 12 to enable electronic throttle control (ETC). In this manner, the throttle 21 may be operated to vary the intake air provided to the combustion chambers 30. For example, the controller 12 may adjust the throttle plate 22 to increase an opening of the throttle 21. Increasing the opening of the throttle 21 may increase the amount of air supplied to the intake manifold 44. In an alternate example, the opening of the throttle 21 may be decreased or closed completely to shut off airflow to the intake manifold 44. In some embodiments, additional throttles may be present in intake passage 42, such as a throttle upstream of a compressor 60 (not shown).

Further, in the disclosed embodiments, an exhaust gas recirculation (EGR) system may route a desired portion of exhaust gas from the exhaust passage 48 to the intake passage 42 via an EGR passage, such as high pressure EGR passage 140. The amount of EGR provided to the intake passage 42 may be varied by the controller 12 via an EGR valve, such as high pressure EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger through EGR passage 140. FIG. 1 also shows a low pressure EGR system where EGR is routed from downstream of turbine of a turbocharger to upstream of a compressor of a turbocharger through low pressure EGR passage 156. A low pressure EGR valve 154 may control the amount of EGR provided to the intake passage 42. In some embodiments, the engine may include both a high pressure EGR and a low pressure EGR system, as shown in FIG. 1. In other embodiments, the engine may include either a low pressure EGR system or a high pressure EGR system. When operable, the EGR system may induce the formation of condensate from the compressed air, particularly when the compressed air is cooled by the charge air cooler, as described in more detail below.

The engine 10 may further include a compression device such as a turbocharger or supercharger including at least a compressor 60 arranged along the intake passage 42. For a turbocharger, the compressor 60 may be at least partially driven by a turbine 62, via, for example a shaft, or other coupling arrangement. The turbine 62 may be arranged along the exhaust passage 48. Various arrangements may be provided to drive the compressor. For a supercharger, the compressor 60 may be at least partially driven by the engine and/or an electric machine, and may not include a turbine. Thus, the amount of compression provided to one or more cylinders of the engine via a turbocharger or supercharger may be varied by the controller 12.

In the embodiment shown in FIG. 1, the compressor 60 may be driven primarily by the turbine 62. The turbine 62 may be driven by exhaust gases flowing through the exhaust passage 48. Thus, the driving motion of the turbine 62 may drive the compressor 60. As such, the speed of the compressor 60 may be based on the speed of the turbine 62. As the speed of the compressor 60 increases, more boost may be provided through the intake passage 42 to the intake manifold 44.

Further, the exhaust passage 48 may include a wastegate 26 for diverting exhaust gas away from the turbine 62. Additionally, the intake passage 42 may include a compressor bypass or recirculation valve (CRV) 27 configured to divert intake air around the compressor 60. The wastegate 26 and/or the CRV 27 may be controlled by the controller 12 to be opened when a lower boost pressure is desired, for example. For example, in response to compressor surge or a potential compressor surge event, the controller 12 may open the CRV 27 to decrease pressure at the outlet of the compressor 60. This may reduce or stop compressor surge. In some embodiments, the CRV 27 may be two position valve adjustable between a closed and an open position. In other embodiments, the CRV 27 may be a multiple position valve adjustable into a plurality of positions between fully opened and fully closed. As such, the CRV 27 may be adjusted to vary flow around the compressor 60 and control an induction pressure, as discussed further below.

The intake passage 42 may further include a charge air cooler (CAC) 80 (e.g., an intercooler) to decrease the temperature of the turbocharged or supercharged intake gases. In some embodiments, the CAC 80 may be an air to air heat exchanger. In other embodiments, the CAC 80 may be an air to liquid heat exchanger. The CAC 80 may also be a variable volume CAC. Hot charge air (boosted air) from the compressor 60 enters the inlet of the CAC 80, cools as it travels through the CAC, and then exits to pass through the throttle 21 and then enter the engine intake manifold 44. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point temperature. Further, when the charge air entering the CAC is boosted (e.g., boost pressure and/or CAC pressure is greater than atmospheric pressure), condensate may form if the CAC temperature falls below the dew point temperature. When the charge air includes recirculated exhaust gasses, the condensate can become acidic and corrode the CAC housing. The corrosion can lead to leaks between the air charge, the atmosphere, and possibly the coolant in the case of water-to-air coolers. Further, if condensate builds up in the CAC, it may be ingested by the engine during times of increased airflow. As a result, unstable combustion and/or engine misfire may occur.

An induction pressure may be measured at the outlet of the CAC, before the throttle 21. As such, the induction pressure may be referred to as a pre-throttle pressure. In one example, the induction pressure may be determined with a sensor, such as sensor 124. A ratio between the induction pressure and atmospheric pressure may be referred to as an induction pressure ratio. A ratio between a CAC pressure (may be the induction pressure or an average CAC pressure) may be referred to as a CAC pressure ratio. When the CAC pressure ratio and/or the induction pressure ratio are greater than 1, the induction pressure is greater than atmospheric pressure and the engine is operating under boosted conditions. Thus, when the induction pressure ratio is greater than 1, condensate may form in the CAC. However, if the induction pressure ratio is maintained at or below 1, condensate may not form. In this way, reducing the induction pressure ratio from above 1 to 1 or below may reduce CAC condensate formation.

The induction pressure ratio may be reduced by reducing boost. In one example, opening the wastegate 26 may reduce boost. For example, the controller 12 may open the wastegate 26, thereby causing exhaust gas to bypass the turbine 62. This, in turn, decreases the speed of the turbine and, subsequently, the speed of the compressor 60. Slowing the speed of the compressor 60 results in less boost, thereby reducing the boost pressure, CAC pressure, and the induction pressure. In another example, opening the CRV 27 may reduce boost. For example, the controller 12 may open the CRV 27, thereby causing intake air to recirculate around the compressor. This may cause the boost pressure to decrease to atmospheric pressure. As a result, the CAC pressure and induction pressure may decrease and the resulting induction pressure ratio may be substantially equal to 1.

While opening either the CRV 27 or the wastegate 26 may decrease boost, under some conditions, opening the wastegate 26 may result in turbo lag. For example, the controller may open the wastegate 26 to reduce boost pressure, thereby decreasing turbine and compressor speed. If the controller receives an increased torque demand during the opening of the wastegate 26, the compressor may be spinning too slowly to immediately deliver the required boost pressure for the torque demand. The time is takes to close the wastegate 26 and increase the compressor speed to deliver the required boost may be referred to as turbo lag. As a result of turbo lag, there may be a delay in engine torque output. Thus, the controller may only open the wastegate 26 to decrease induction pressure when the engine is at steady-state conditions. In one example, steady-state conditions may include the engine operating in cruise control and/or at a relatively constant pedal position. As such, the torque demand may not be increasing. If the engine is not operating at steady-state, the CRV 27 may be opened while maintaining the wastegate 26 closed. In this way, induction pressure may be reduced to reduce CAC condensate formation while also reducing a potential for turbo lag.

Further, opening the CRV 27 may not only decrease induction pressure, but also increase the temperature of the induction or charge air entering the CAC. For example, when the CRV is open, the induction air may recirculate around the compressor and be re-compressed by the compressor. Re-compressing the induction air may increase the temperature of the induction air, thereby increasing the temperature of the charge air entering the CAC. This may help to maintain the air temperature within the CAC above the dew point temperature, thereby reducing condensate formation in the CAC. In an alternate example, a bypass passage may alternatively or additionally be positioned after the CAC, such that cooled charge air recirculates around the CAC and the compressor. In some examples, an amount of opening of the CRV 27 may be adjusted to vary the flow through the CRV 27 and the compressor. For example, the controller may adjust the position of the CRV 27 to achieve a target induction pressure and/or air temperature in the CAC.

In some examples, opening both the CRV 27 and the wastegate 26 may decrease induction pressure faster, thereby reducing condensate formation more quickly. Thus, under some conditions, the controller may simultaneously open the CRV 27 and the wastegate 26 to quickly reduce induction pressure and reduce condensate formation in the CAC. Opening both the CRV 27 and the wastegate 26 may be based on the induction pressure, a compressor surge level, and/or an ambient or intake air humidity level. In this way, the CRV 27 and the wastegate 26 may be adjusted to maintain the induction pressure below the dew point for a current temperature and humidity level. Further details on methods for controlling the CRV 27 and the wastegate 26 to reduce condensate formation are discussed below with reference to FIGS. 2-4.

The controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10 for performing various functions to operate the engine 10. In addition to those signals previously discussed, these signals may include measurement of inducted mass air flow from MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by the controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the Hall effect sensor 118, which is also used as an engine speed sensor, may produce a predetermined number of equally spaced pulses every revolution of the crankshaft 40.

Other sensors that may send signals to controller 12 include a temperature and/or pressure sensor 124 at an outlet of a charge air cooler 80, and a boost pressure sensor 126. Other sensors not depicted may also be present, such as a sensor for determining the intake air velocity at the inlet of the charge air cooler, a sensor for determining intake air humidity, and other sensors. In some examples, storage medium read-only memory chip 106 may be programmed with computer readable data representing instructions executable by microprocessor unit 102 for performing the methods described below as well as other variants that are anticipated but not specifically listed. Example routines are described herein at FIGS. 2-3.

The system of FIG. 1 provides for an engine system including an engine with an intake manifold, a throttle positioned upstream of the intake manifold, a turbocharger with a turbine operable to drive a compressor, a compressor recirculation valve operable to divert intake air around the compressor, a charge air cooler positioned upstream of the throttle and downstream of the compressor, a wastegate operable to divert exhaust gas around the turbine, and a controller with computer readable instructions for opening the wastegate responsive to an induction pressure, measured downstream of the charge air cooler and upstream of the throttle, greater than a first threshold pressure, during driving conditions when the induction pressure is greater than required to produce an intake manifold pressure (e.g., MAP) required for a torque demand and the engine is at steady-state. Further, the controller may open the compressor recirculation valve, in addition to opening the wastegate, in response to one or more of the induction pressure being greater than a second threshold pressure, the second threshold pressure being greater than the first threshold pressure and/or a compressor surge condition. The controller may open the compressor recirculation valve while maintaining the wastegate closed in response to the induction pressure being greater than the first threshold pressure, during driving conditions when the induction pressure is greater than required to produce an intake manifold pressure (e.g., MAP) required for a torque demand and the engine is not at steady-state.

Figure 2:
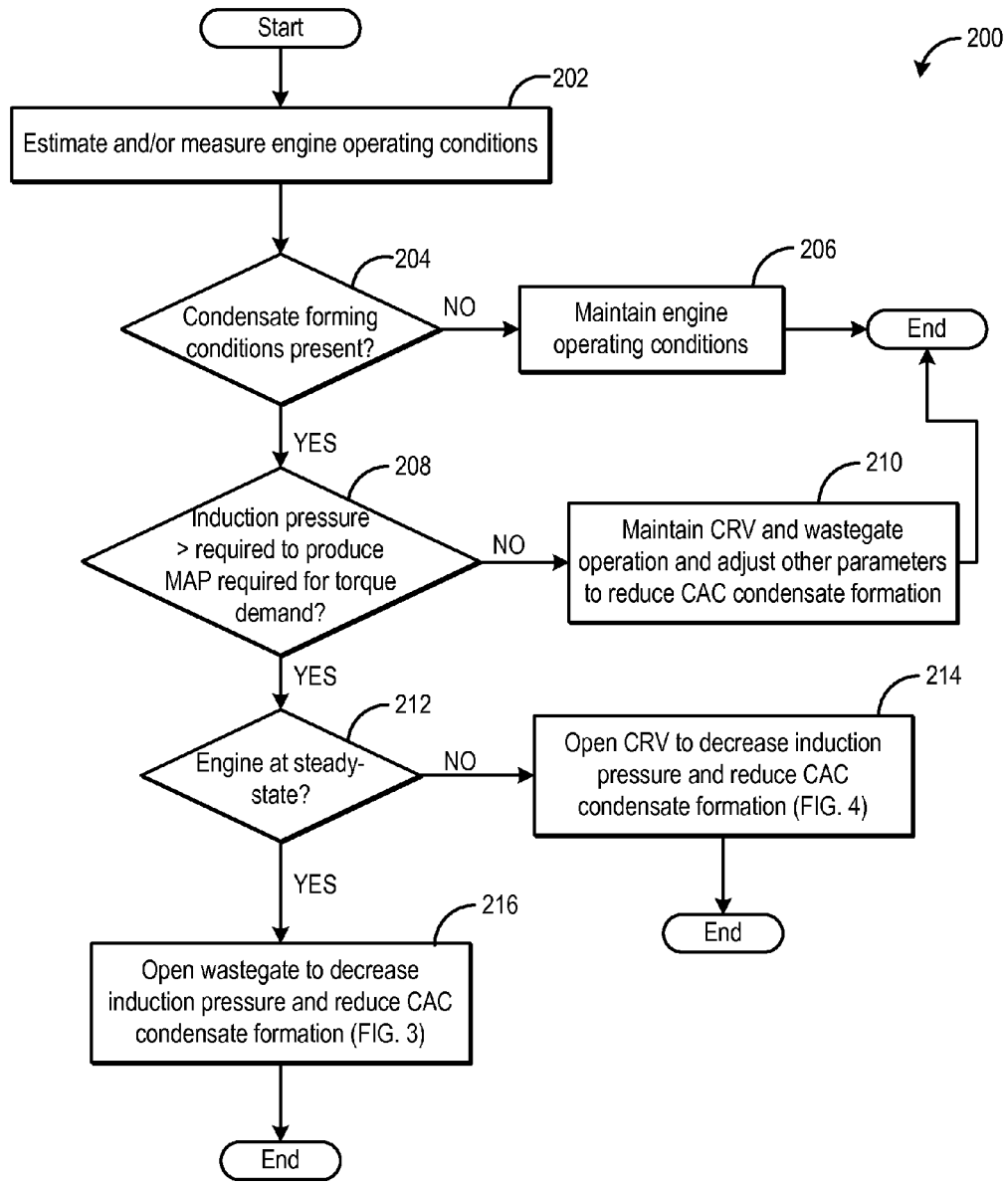
FIG. 2 shows a flow chart illustrating a method for adjusting a wastegate and/or a compressor recirculation valve to reduce condensate formation in a charge air cooler based on engine operating conditions.

Turning now to FIG. 2, a method 200 is presented for adjusting a wastegate and/or a compressor recirculation valve (CRV) to reduce condensate formation in a CAC based on engine operating conditions. In one example, the method 200 is executable by the controller 12 shown in FIG. 1. Specifically, the controller may adjust a position of the wastegate and/or the CRV (such as the wastegate 26 and the CRV 27 shown in FIG. 1) based on condensate forming conditions in the CAC, torque demand, and additional engine operating conditions. The base position of the wastegate and the CRV may be closed. Additionally, as described below in the method 200, the controller may fully open and fully close the CRV and the wastegate. In an alternate embodiment, the controller may adjust the wastegate and/or the CRV to a plurality positions between fully opened and fully closed.

The method begins at 202 by estimating and/or measuring engine operating conditions. Engine operating conditions may include engine speed and load, boost pressure, induction pressure, pedal position, mass air flow, MAP, EGR flow, humidity, engine temperature, torque demand, charge air cooler conditions (inlet temperature, outlet temperature, inlet pressure, outlet pressure, flow rate through the cooler, etc.), etc. At 204, the method includes determining if condensate forming conditions in the CAC are present. In one example, condensate forming conditions include when the induction pressure (e.g., the pressure at the outlet of the CAC, upstream of the throttle) is greater than a threshold pressure, which may be a first threshold pressure. In one example, the threshold pressure may be atmospheric pressure. In another example, the threshold pressure may be a pressure greater than atmospheric pressure. Alternatively or additionally, the controller may determine the induction pressure ratio as the ratio between the induction pressure and atmospheric pressure. As such, condensate forming conditions may include when the induction pressure ratio is greater than 1. In another example, condensate forming conditions include when a humidity is greater than a first threshold. The humidity may either be a measured or inferred humidity. For example, the humidity may be one or more of a measured ambient humidity and/or an intake air humidity. In an alternate example, the humidity may be inferred based on a windshield wiper on/off condition or duty cycle. The first threshold may be based on a humidity level at which condensate is likely to form in the CAC.

If condensate forming conditions are not present at 204, the method continues on to 206 to maintain engine operating conditions. Maintaining engine operating conditions may include maintaining the wastegate and the CRV in closed positions. However, if condensate forming conditions are confirmed at 204, the method continues on to 208 to determine if the induction pressure is greater than required to produce a manifold pressure (MAP) required for a torque demand. Specifically, at 208, the controller may compare a current and measured or inferred barometric pressure (e.g., actual MAP) to a requested MAP as required by the torque demand. The MAP required for a torque demand may be determined based on the pedal position. For example, a pedal position input may indicate an amount of charge air required to produce the demanded torque. The amount of charge air may then be used to determine the required MAP. For example, if the torque demand increases, as indicated by an increase in pedal position, an increased MAP may be required to produce the demanded torque. As such, MAP may increase with increasing torque demand. An increase in requested MAP may also result in an increase in requested boost when the pressure required to produce the torque demand is greater than atmospheric pressure. Thus, at 208, the controller may determine if boost is required to produce the required MAP and, subsequently, the demanded torque. In one example, the induction pressure may be greater than required to produce the MAP for a torque demand when the accelerator is partially depressed (e.g., pedal position is greater than 0 but less than wide open pedal) and the MAO is less than atmospheric pressure.

Returning to 208, if the induction pressure is not greater than required to produce the MAP required for the torque demand (e.g., an increase in MAP and boost is required), the controller maintains the CRV and wastegate operation at 210. Maintaining the CRV and wastegate operation may include maintaining the CRV and wastegate closed, even if condensate forming conditions are present. Additionally, the method at 210 may include adjusting alternative parameters to reduce CAC condensate formation. Alternative parameters may include closing vehicle grille shutters, reducing a speed of one or more engine fans, decreasing a CAC coolant pump speed, increasing airflow to the intake manifold to purge condensate from the CAC, etc.

Alternatively, if the induction pressure is greater than required to produce the required MAP for the torque demand at 208, the method continues on to 212 to determine if the engine is operating at steady-state conditions. In one example, steady-state conditions include the engine operating in cruise control. In another example, steady-state conditions include a relatively constant pedal position. For example, the relatively constant pedal position may result in a vehicle speed remaining within 2 mph of an average vehicle speed. In another example, a relatively constant pedal position may be indicated by less than a 5% change in pedal position over a period of time. Additionally, steady-state conditions may include the pedal position being greater than zero, thereby indicating that the accelerator is at least partially depressed. The above listed steady-state conditions may indicate that a sudden increase in pedal position, thereby increasing torque demand, may not be expected. As such, if the wastegate is opened during the steady-state conditions, the risk of turbo lag may be reduced.

Returning to 212, if the engine is not operating at steady-state, the method continues on to 214 to open the CRV to decrease the induction pressure and reduce CAC condensate formation. A method for controlling the CRV during the induction pressure reduction is presented at FIG. 4. Opening the CRV instead of the wastegate may reduce turbo lag if the controller receives an increase in torque demand requiring increased boost during the reducing the induction pressure.

Alternatively at 212, if the engine is at steady-state, the method continues on to 216 to open the wastegate to decrease the induction pressure and reduce CAC condensate formation. A method for controlling the wastegate during the induction pressure reduction is presented at FIG. 3. The method at 216 may also include opening the CRV to decrease induction pressure. In some embodiments, the controller may open only the CRV to decrease induction pressure. In these embodiments, method 200 may proceed directly from 208 to 214. While this may reduce a risk for turbo lag, the induction pressure may decrease more slowly with the wastegate remaining closed.

In this way, a wastegate and/or a CRV may be adjusted in response to CAC condensate forming conditions when an induction pressure is greater than required to produce a manifold pressure required for a torque demand. Methods for adjusting the wastegate and/or the CRV may be carried out by an engine controller. In one example, a controller may adjust only a wastegate in response to CAC condensate forming conditions when the induction pressure is greater than required to produce the manifold pressure required for a torque demand. In another example, the controller may adjust only the CRV in response to CAC condensate forming conditions when the induction pressure is greater than required to produce the manifold pressure required for the torque demand. In yet another example, the controller may adjust both the CRV and the wastegate in response to CAC condensate forming conditions when the induction pressure is greater than required to produce the manifold pressure required for the torque demand. Condensate forming conditions may include one or more of an induction pressure greater than atmospheric pressure, and induction pressure ratio greater than 1, and/or a humidity greater than a first threshold. Further, the induction pressure may be measured between the compressor and the throttle.

Specifically, the controller may open the wastegate in response to CAC condensate forming conditions when the induction pressure is greater than required to produce the manifold pressure required for the torque demand and the engine is at steady-state conditions. Steady-state conditions may include one or more of a cruise control operation and a constant pedal position. Further, the controller may open the CRV, in addition to opening the wastegate, in response to one or more of the induction pressure being greater than a threshold pressure, the threshold pressure being a threshold amount greater than atmospheric pressure, the humidity being greater than a second threshold, the second threshold greater than the first threshold, and a compressor surge condition. After opening the wastegate to reduce induction pressure, the controller may close the wastegate in response to one or more of the induction pressure decreasing to or below atmospheric pressure (or a pressure which may maintain the CAC temperature above the dewpoint at an induction temperature) and/or an increase in torque demand. In another example, the controller may maintain the wastegate closed and open the compressor recirculation valve in response to charge air cooler condensate forming conditions when the induction pressure is greater than required and the engine is not at steady-state conditions. In yet another example, the controller may maintain both the wastegate and the compressor recirculation valve closed in response to charge air cooler condensate forming conditions when the induction pressure is not greater than required to produce the manifold pressure required for the torque demand.

Figure 3:
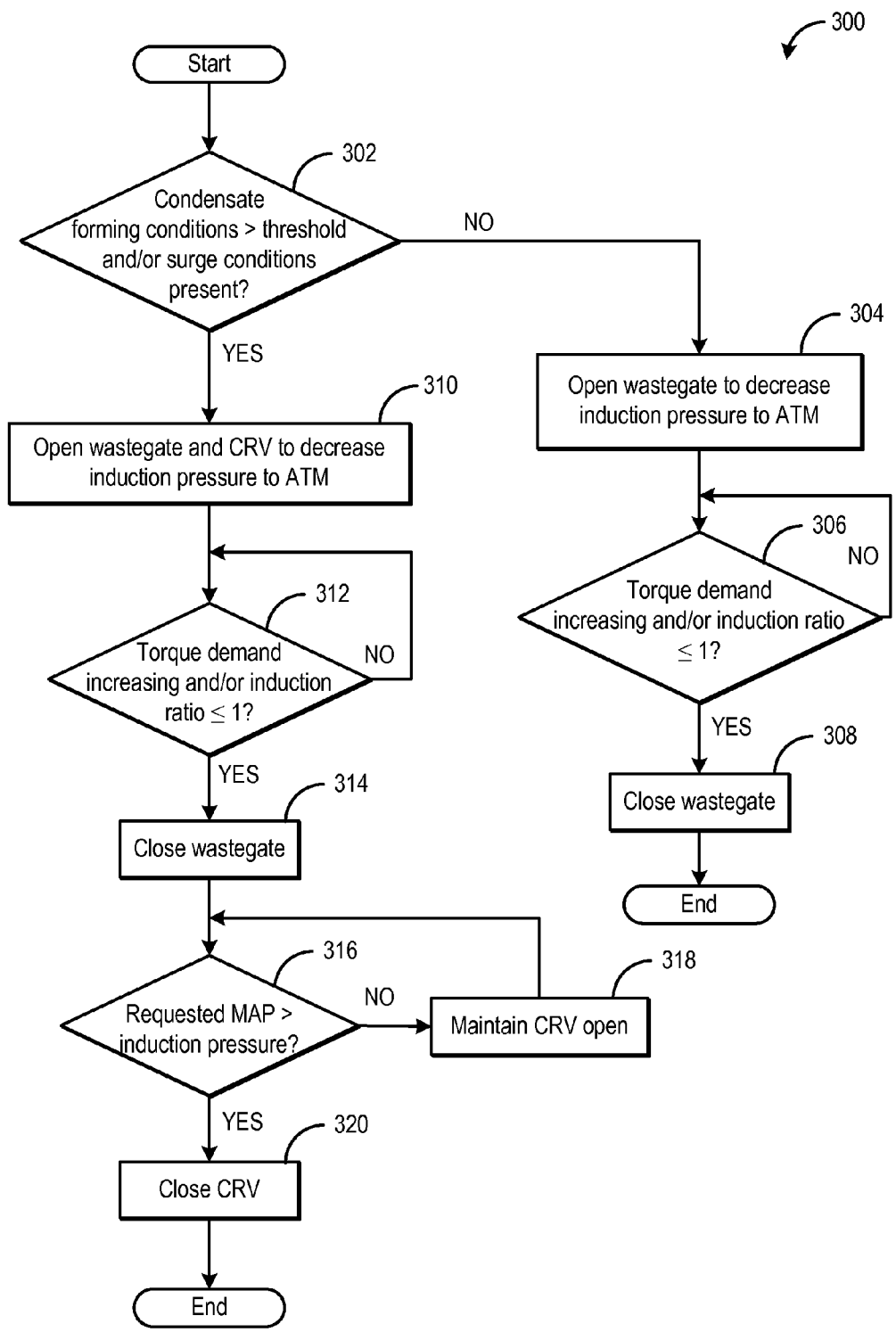
FIG. 3 shows a flow chart illustrating a method for adjusting a wastegate to decrease an induction pressure and subsequently reduce condensate formation in a charge air cooler.

FIG. 3 shows a method 300 for adjusting a wastegate to decrease an induction pressure and subsequently reduce condensate formation in a CAC. Method 300 continues on from 216 in method 200. The method begins at 302 by determining a level or severity of the condensate forming conditions at the CAC and/or if compressor surge conditions are present. Specifically, at 302 the method determines if condensate forming conditions are greater than a threshold. Condensate forming conditions greater than a threshold (induction pressure and temperature below the dewpoint condition) may include the induction pressure being greater than a second threshold pressure. The second threshold pressure may be a threshold amount greater than the first threshold pressure, or atmospheric pressure. As the induction pressure increases, the potential for condensate formation in the CAC may also increase. Further, condensate forming conditions greater than a threshold may include the induction pressure and induction air temperature being below the dew point conditions (e.g., the condition at which condensate may form). Additionally, or alternatively, condensate forming conditions greater than a threshold may include the humidity being greater than a second threshold, the second threshold being greater than the first threshold (as introduced at 204 in FIG. 2). At 302, determining if surge conditions are present may include determining if the induction pressure is greater than a surge threshold and/or determining if there is a tip-out. In some embodiments, the presence of potential surge conditions may result in the controller opening the CRV to reduce or avoid compressor surge.

If none of the conditions at 302 are met, the method continues on to 304 to open the wastegate to decrease the induction pressure to atmospheric pressure (e.g., ATM). As such, the induction pressure ratio may decrease to 1. At 306, the controller determines if the torque demand is increasing and/or if the induction pressure ratio is substantially equal to or less than 1 (e.g., the induction pressure is at or below atmospheric pressure). If the torque demand is not increasing (e.g., the engine remains at steady-state) and the induction pressure ratio remains above 1, the wastegate remains open and the method circles back to 306. However, if one or more of the conditions at 306 are met, the method continues on to 308 to close the wastegate and stop reducing the induction pressure.

Returning to 302, if one or more of the conditions at 302 are met, the method continues on to 310 to open both the wastegate and the CRV to decrease the induction pressure to atmospheric pressure (e.g., ATM). Opening the wastegate and the CRV together may decrease the induction pressure and the induction pressure ratio more quickly than just opening one of the wastegate or the CRV. Further, opening the CRV may increase the temperature of the charge air (e.g., induction air) and thereby reduce condensate formation in the CAC. At 312, the method includes determining if torque demand is increasing and/or if the induction pressure ratio is substantially equal to or less than 1 (e.g., the induction pressure is at or below atmospheric pressure). If the torque demand is not increasing (e.g., the engine remains at steady-state) and the induction pressure ratio remains above 1, the wastegate remains open and the method circles back to 312. However, if one or more of the conditions at 312 are met, the method continues on to 314 to close the wastegate. In this way, the controller may close the wastegate to reduce turbo lag while maintaining the CRV open to continue reducing the induction pressure.

At 316, the controller determines if a requested MAP is greater than a pressure available to produce the requested MAP and/or if the induction pressure ratio is substantially equal to or less than 1 (e.g., the induction pressure is at or below atmospheric pressure). The pressure available to produce the requested MAP may be the induction pressure. The requested MAP may be based on a torque demand or request. As such, if the requested MAP is greater than the induction pressure, and the throttle and additional engine actuators are already adjusted to increase torque, then an increase in boost may be required. For example, if the engine requires increased pressure to produce the required torque, boosting may be required to increase induction pressure and supply a greater amount of pressure to the intake manifold. Thus, the method at 316 may include determining if boost is required.

If the requested MAP is not greater than the induction pressure and the induction pressure ratio remains above 1, the CRV remains open at 318 and the method circles back to 316. However, if one or more of the conditions at 316 are met, the method continues on to 320 to close the CRV. In an alternate embodiment, the CRV may remain open until the requested MAP is greater than the induction pressure, even if the induction pressure ratio is substantially equal to 1. As such, the method at 316 may include only determining if the requested MAP is greater than the current MAP. In this way, the induction pressure may remain low until increased boost is required, thereby decreasing the likelihood of condensate formation in the CAC.

In this way, in response to an induction pressure greater than a first threshold pressure, during driving conditions when the induction pressure is greater than required to produce a manifold pressure required for a torque demand and the engine is at steady-state, a wastegate may be opened to decrease the induction pressure. The wastegate may also be opened in response to a humidity greater than a first threshold, during driving conditions when the induction pressure is greater than required to produce the manifold pressure required for the torque demand and the engine is at steady-state. Further, a compressor recirculation valve may be opened in response to one or more of the induction pressure being greater than a second threshold pressure, the second threshold pressure being greater than the first threshold pressure, a humidity being greater than a second threshold, the second threshold being greater than the first threshold, and/or a compressor surge condition. After opening the compressor recirculation valve and the wastegate, the wastegate may be closed responsive to one or more of the torque demand increasing and/or the induction pressure decreasing to or below the threshold pressure (e.g., the induction pressure ratio decreasing to 1) and then the compressor recirculation valve may be closed responsive to one or more of a required induction pressure for the torque demand being greater than the induction pressure and/or the induction pressure decreasing to or below the threshold pressure.

After the opening the wastegate to decrease the induction pressure the wastegate may be closed responsive to one or more of the induction pressure decreasing to or below the threshold pressure and an increase in torque demand. Further, the compressor recirculation valve may be opened and the wastegate may be maintained closed when the engine is not at steady-state. As such, the induction pressure may be reduced by opening the compressor recirculation valve while reducing turbo lag. In one example, the first threshold pressure is based on a pressure at which condensate forms in a charge air cooler. In another example, the first threshold pressure is atmospheric pressure.

Figure 4:
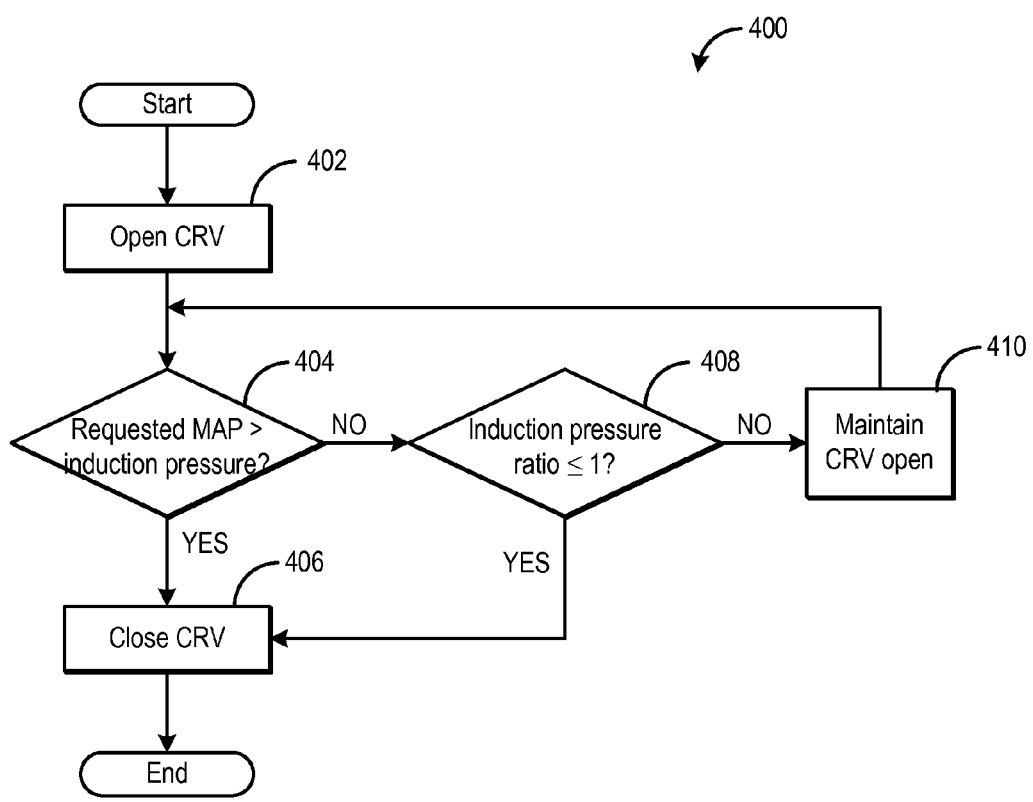
FIG. 4 shows a flow chart illustrating a method for adjusting a compressor recirculation valve to decrease an induction pressure and subsequently reduce condensate formation in a charge air cooler.
Figure 5:
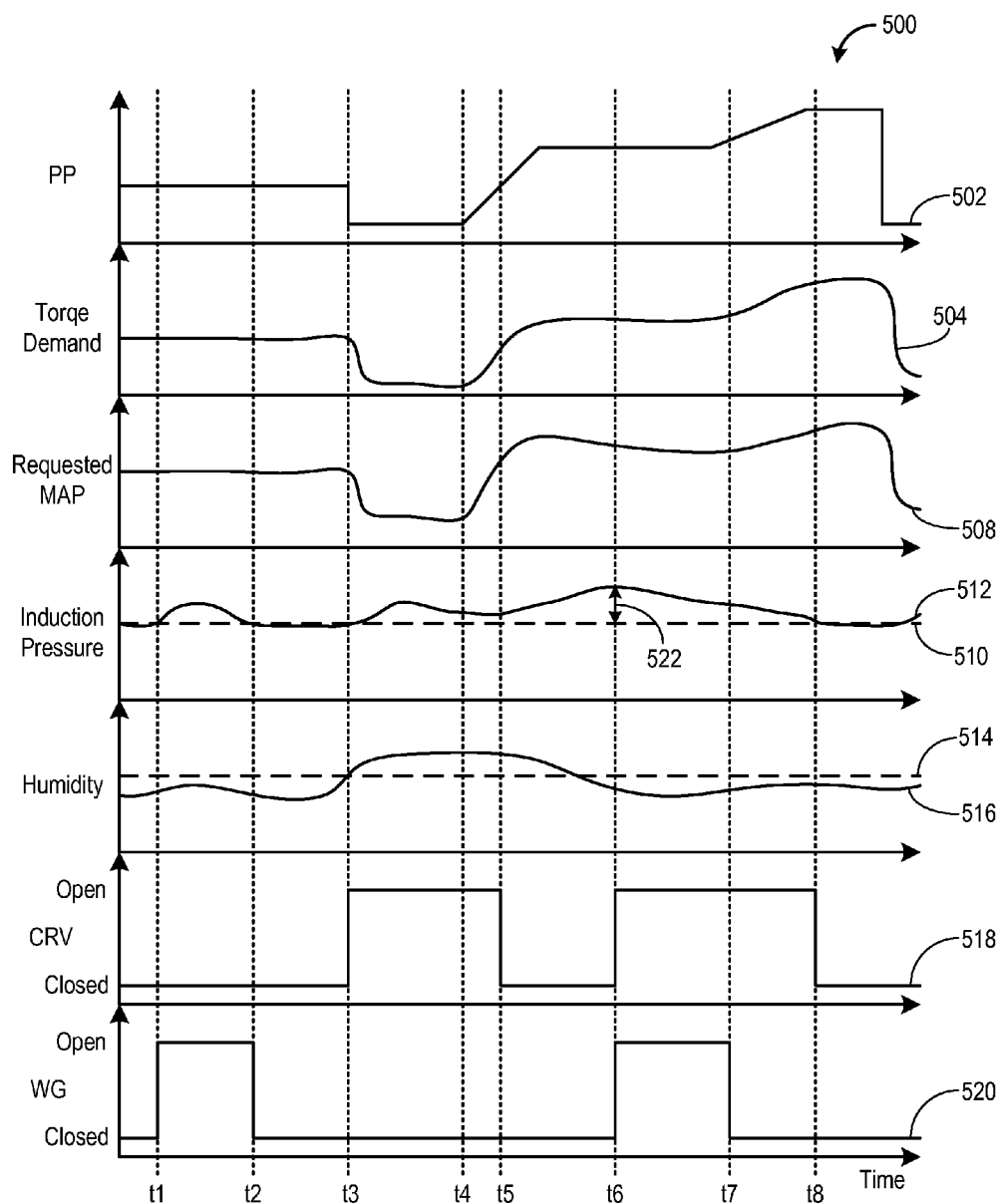
FIG. 5 shows a graph illustrating example wastegate and compressor recirculation valve adjustments based on engine operating conditions.

FIG. 4 shows a method 400 for adjusting the CRV to decrease an induction pressure and subsequently reduce condensate formation in a CAC. Method 400 continues on from 214 in method 200. The method begins at 402 by opening the compressor recirculation valve. required induction pressure for the torque demand being greater than the induction pressure At 404, the method includes determining if a requested MAP is greater than the current induction pressure. As discussed above, the requested MAP may be based on the torque demand. An increase in torque demand may be indicated by an increase in pedal position. If the requested MAP is greater than the current induction pressure, an increase in induction pressure may be required to produce the requested MAP. The induction pressure may increase by operating the compressor and creating boost. If the requested MAP is greater than the current induction pressure and boost is required, the method continues on to 406 to close the CRV. Closing the CRV may allow the compressor to supply increased boost to the intake manifold, as required by the torque demand However, if the requested MAP is not greater than the induction pressure and boost is not required at 404, the method continues on to 408 to determine if the induction pressure ratio is substantially equal to, or less than, 1 (e.g., the induction pressure is less than or equal to the atmospheric or threshold pressure, or below the dewpoint at the given induction temperature. If the induction pressure ratio is substantially equal to 1 or less than 1, the controller closes the CRV at 406. In an alternate embodiment, the controller may maintain the CRV open until the requested MAP increases above the current MAP, even if the induction ratio decreases to 1. At 408, if the induction pressure ratio is still greater than 1, the controller maintains the CRV open at 410 and the method then returns to 404.

In this way, in response to charge air cooler condensate forming conditions, during driving conditions when a pre throttle pressure is greater than required to produce the needed MAP for a torque demand, an engine controller may open a compressor recirculation valve. In one example, the condensate forming conditions include one or more of an induction pressure greater than atmospheric pressure and a humidity greater than a first threshold. The humidity may be one or more of a measured humidity and an inferred humidity of intake air. In one example, after opening the compressor recirculation valve to decrease the induction pressure, the controller may close the compressor recirculation valve in response to a requested manifold pressure increasing above the induction pressure. In another example, after opening the compressor recirculation valve to decrease the induction pressure, the controller may close the compressor recirculation valve in response to the induction pressure decreasing to atmospheric pressure. Further, the controller may open a wastegate in response to charge air cooler condensate forming conditions, during driving conditions when the induction pressure is greater than required to produce a manifold pressure required for a torque demand and the engine is at steady-state. Opening the wastegate may aid in decreasing the induction pressure, thereby reducing the induction pressure at a faster rate. The controller may then close the wastegate in response to one or more of an increase in torque demand and the induction pressure decreasing to atmospheric pressure. Further, the controller may maintain the compressor recirculation valve closed an adjust alternative engine operating parameters when the induction pressure is not greater than required to produce the manifold pressure required for the torque demand. In one example, adjusting alternative engine operating parameters may include adjusting a vehicle grille shutter system, adjusting a speed of one or more engine fans, and/or adjusting airflow to an intake manifold. In another example, the controller may open the compressor recirculation valve responsive to compressor surge conditions.

FIG. 5 shows a graphical example of wastegate and compressor recirculation valve (CRV) adjustments based on engine operating conditions. Specifically, graph 500 shows changes in pedal position (PP) at plot 502, changes in torque demand at plot 504, changes in a requested MAP at plot 508, changes in an induction pressure at plot 512, changes in a humidity at plot 516, changes in a position of the CRV at plot 518, and changes in a position of the wastegate at plot 520. The induction pressure may be an estimated or measured pressure at an outlet of a CAC, upstream of an intake throttle. At plot 512, the induction pressure is compared to a threshold pressure for condensate formation in the CAC. In this example, the threshold pressure is atmospheric pressure 510. As such, when the induction pressure is above atmospheric pressure 510, an induction pressure ratio may be greater than one and condensate may form in the CAC. As discussed above, the humidity may be a measured or inferred humidity of the intake air. Further, graph 500 shows the CRV and the wastegate being adjusted between an open and closed position. In an alternate embodiment, the controller may adjust the wastegate and/or the CRV into a plurality of positions between fully open and fully closed.

Prior to time t1, pedal position (plot 502), torque demand (plot 504), and requested MAP (plot 508) may be at relatively constant levels. The CRV and the wastegate are both closed (plots 518 and 520). The induction pressure is near the requested MAP; however, the induction pressure and the humidity remain at or below their respective thresholds for indicating condensate forming conditions (plots 512 and 516). At time t1, the induction pressure increases above atmospheric pressure 510 (plot 512) while remaining greater than the requested MAP (plots 512 and 508). Also at time t1, the pedal position is relatively constant, indicating the engine is at steady-state. In response to the induction pressure increasing above atmospheric pressure 510 during the above driving conditions, a controller opens the wastegate to decrease the induction pressure (plot 520). At time t1, the CRV remains closed since the condensate forming conditions are not above a threshold (e.g., the induction pressure is not above a second threshold pressure). However, in alternate embodiments, the CRV may also open at time t1 to increase a rate at which the induction pressure decreases. In another embodiment, the CRV may open at time t1 instead of opening the wastegate, as such the wastegate may remain closed.

At time t2, the induction pressure decreases to atmospheric pressure 510. In response, the controller closes the wastegate (plot 520). At time t3, the humidity increases above a threshold 514, thereby indicating the presence of condensate forming conditions at the CAC (plot 516). Also at time t3, pedal position decreases (plot 502) and the induction pressure is greater than required to produce the requested MAP for the torque demand. Thus, in response to humidity increasing above threshold 514 when the induction pressure is greater than required for the torque demand and the engine is not at steady-state, the controller opens the CRV at time t3. At time t4, the pedal position increases (plot 502), thereby increasing torque demand (plot 504). As a result, the requested MAP increases above the induction pressure at time t5. In response, the controller closes the CRV to increase the boost supplied to the engine.

After closing the CRV, the induction pressure increases further above atmospheric pressure 510. However, since the requested MAP is still greater than the induction pressure, the wastegate and the CRV remain closed. Between time t5 and time t6 the pedal position levels out and the engine is operating at steady-state conditions. At time t6, the induction pressure increases above the requested MAP (plots 512 and 508). At this time, the induction pressure may be a threshold amount 522 above atmospheric pressure 510 (e.g., the induction pressure is greater than a second threshold pressure). As a result, the controller opens both the CRV and the wastegate at time t6. Just before time t7, the pedal position increases (plot 502). The increase in pedal position causes the torque demand to begin increasing at time t7. In response to the torque demand increasing, the controller closes the wastegate; however, the CRV remains open. Keeping the CRV open longer allows the induction pressure to continue decreasing while reducing turbo lag. At time t8, the requested MAP increases above the induction pressure. As a result, the controller closes the CRV (plot 518).

As shown at time t1 and time t6 in FIG. 5, during a first condition, a controller may open a wastegate in response to one or more of an induction pressure being greater than a first threshold pressure and a humidity greater than a threshold. The first condition includes when an induction pressure is greater than required based on a torque demand and the engine is at steady-state. Further, the controller may open the CRV in response to one or more of a compressor surge condition and the induction pressure being greater than a second threshold pressure (as shown at time t6), the second threshold pressure being greater than the first threshold pressure.

As shown at time t3, during a second condition, the controller may open the CRV in response to a humidity greater than a threshold (e.g., threshold 514 shown in FIG. 5). In another example, the controller may open the CRV during the second condition in response to the induction pressure being greater than a first threshold pressure. As shown in FIG. 5, the first threshold pressure is atmospheric pressure. The second condition includes when the induction pressure is greater than required based on a torque demand and the engine is not at steady-state. In another embodiment, the second condition may include when the induction pressure is greater than required based on a torque demand. In this embodiment, the CRV may open at time t1 instead of or in addition to opening the wastegate.

As shown at time t5, during a third condition, the controller maintains the CRV and the wastegate closed. The third condition includes when the induction pressure is at or below the requested level, the requested level based on the torque demand. At time t5, the wastegate and the CRV remain closed even though the induction pressure is greater than atmospheric pressure.

In this way, opening one or more of a compressor recirculation valve (CRV) and/or a wastegate in response to charge air cooler (CAC) condensate forming conditions may reduce an induction pressure, thereby reducing a potential for condensate formation in the CAC. In one example, condensate forming conditions may include the induction pressure being greater than a threshold pressure. The threshold pressure may be atmospheric pressure. Similarly, condensate forming conditions may also be determined from an induction pressure ratio being greater than 1, the induction pressure ratio being a ratio between the induction pressure and atmospheric pressure. In another example, condensate forming conditions may include a humidity being greater than threshold for condensate formation.

Specifically, the controller may open the wastegate and/or the CRV in response to one or more of the condensate forming conditions during driving conditions when the induction pressure is greater than required to produce the manifold pressure (MAP) required for a torque demand. In one example, the controller may open only the wastegate when the engine is at steady-state and the condensate forming conditions are below a threshold. In another example, the controller may open only the CRV when the engine is not at steady-state. In yet another example, the controller may open both the CRV and the wastegate when the engine is at steady-state and the condensate forming conditions a greater than a threshold. The threshold of the condensate forming conditions may be based on induction pressure and/or humidity levels which indicate increased condensate formation. After opening one or more of the wastegate and/or the CRV, the controller may close the valves when torque demand increases and/or when the induction pressure has decreased to atmospheric pressure. Adjusting the CRV and the wastegate in this way may reduce induction pressure when a higher manifold pressure is not required by the engine. As such, condensate formation in the CAC may be reduced, thereby reducing a potential for engine misfire and/or unstable combustion.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. A method of reducing charge air cooler condensate in an engine system comprising: while operating the engine, adjusting a wastegate in a bypass around a turbine arranged in an engine exhaust passage in response to condensate forming conditions in a charge air cooler when an induction pressure of air measured upstream of a throttle and downstream of the charge air cooler in an engine intake passage is greater than a requested level, the requested level based on an engine torque demand.

2. The method of claim 1, further comprising opening the wastegate in response to the condensate forming conditions when the induction pressure is greater than the requested level and the engine is at steady-state conditions, where steady-state conditions include at least one of when the engine torque demand is not increasing and when the engine is operating at a relatively constant pedal position that is greater than zero and that maintains a vehicle speed within a threshold speed of an average speed, and wherein the requested level is based on an amount of charge air required to produce the engine torque demand and an engine intake manifold pressure required to produce the amount of charge air.

3. The method of claim 2, wherein steady-state conditions include at least one of a cruise control operation and a constant pedal position and wherein the throttle and charge air cooler are arranged in the engine intake passage, upstream of engine cylinders of the engine.

4. The method of claim 2, wherein the condensate forming conditions include at least one of the induction pressure being greater than atmospheric pressure and a humidity greater than a first threshold.

5. The method of claim 4, further comprising opening a compressor recirculation valve arranged in a bypass around a compressor disposed in the engine intake passage, where the compressor is at least partially driven by the turbine, in addition to opening the wastegate, in response to at least one of the induction pressure being greater than a threshold pressure, the threshold pressure a threshold amount greater than atmospheric pressure, the humidity being greater than a second threshold, the second threshold greater than the first threshold, and a compressor surge condition.

6. The method of claim 2, further comprising closing the wastegate in response to at least one of the induction pressure decreasing to or below atmospheric pressure and an increase in torque demand.

7. The method of claim 1, further comprising closing the wastegate and opening a compressor recirculation valve arranged in a bypass around a compressor disposed in the engine intake passage, where the compressor is at least partially driven by the turbine, in response to the condensate forming conditions when the induction pressure is greater than the requested level and the engine is not at steady-state conditions.

8. The method of claim 1, further comprising closing the wastegate in response to the condensate forming conditions when the induction pressure is not greater than the requested level and wherein the requested level is an engine intake manifold pressure that produces an amount of charge air that produces the engine torque demand.

9. A method of reducing charge air cooler condensate in an engine system, comprising: during operation of the engine: in response to an induction pressure measured between a charge air cooler and intake throttle in an engine intake passage greater than a first threshold pressure, during driving conditions when the induction pressure is greater than a requested level, the requested level based on a torque demands and the engine is at steady-state where the torque demand is not increasing, opening a wastegate in a bypass around a turbine in an engine exhaust passage to decrease the induction pressure.

10. The method of claim 9, further comprising opening the wastegate in response to a humidity greater than a first threshold, during driving conditions when the induction pressure is greater than the requested level and the engine is at steady-state.

11. The method of claim 10, further comprising opening a compressor recirculation valve arranged in a bypass around a compressor disposed in the engine intake passage, where the compressor is at least partially driven by the turbine, in response to at least one of the induction pressure being greater than a second threshold pressure, the second threshold pressure being greater than the first threshold pressure, the humidity being greater than a second threshold, the second threshold being greater than the first threshold, and a compressor surge condition.

12. The method of claim 11, further comprising closing the wastegate responsive to at least one of the torque demand increasing and the induction pressure decreasing to or below the first threshold pressure and then closing the compressor recirculation valve responsive to at least one of the requested level of the induction pressure being greater than the induction pressure and the induction pressure decreasing to or below the second threshold pressure.

13. The method of claim 9, further comprising, after the opening the wastegate to decrease the induction pressure, closing the wastegate responsive to at least one of the induction pressure decreasing to or below the first threshold pressure and an increase in torque demand.

14. The method of claim 9, further comprising opening a compressor recirculation valve arranged in a bypass around a compressor disposed in the engine intake passage, where the compressor is at least partially driven by the turbine, and closing the wastegate when the engine is not at steady-state and the torque demand is increasing.

15. The method of claim 9, wherein the first threshold pressure is based on a pressure at which condensate forms in the charge air cooler.

16. The method of claim 15, wherein the first threshold pressure is atmospheric pressure.

17. A method of reducing charge air cooler condensate in an engine system, comprising: during a first condition of an engine, opening a wastegate arranged in a bypass around a turbocharger turbine disposed in an engine exhaust passage and maintaining a position of a compressor recirculation valve arranged in a bypass around a turbocharger compressor disposed in an engine intake passage upstream of a charge air cooler in response to at least one of an induction pressure measured between the charge air cooler and an intake throttle in the engine intake passage being greater than a first threshold pressure and a humidity upstream of the charge air cooler greater than a threshold; and during a second condition of the engine, opening the compressor recirculation valve and closing the wastegate in response to at least one of the induction pressure being greater than the first threshold pressure and the humidity greater than the threshold.

18. The method of claim 17, wherein the first condition includes when the induction pressure is greater than a requested level, the requested level required-based on a torque demand, and the engine is at steady-state, where steady-state includes at least one of when the engine torque demand is not increasing and when the engine is operating at a relatively constant pedal position that is greater than zero and that maintains a vehicle speed within a threshold speed of an average speed.

19. The method of claim 18, further comprising opening the compressor recirculation valve in response to at least one of a compressor surge condition and the induction pressure being greater than a second threshold pressure, the second threshold pressure being greater than the first threshold pressure.

20. The method of claim 17, wherein the second condition includes when the induction pressure is greater than a requested level, the requested level based on a torque demand and the engine is not at steady-state.

* * * * *